(12) United States Patent
Schulz-Hanke et al.

(10) Patent No.: US 10,294,660 B2
(45) Date of Patent: May 21, 2019

(54) LINE LEADTHROUGH FOR THE LEADTHROUGH OF LINES THROUGH A COMPONENT

(71) Applicant: HILTI AKTIENGESELLSCHAFT, Schaan (LI)

(72) Inventors: Wolfgang Schulz-Hanke, Untermeitingen (DE); Herbert Muenzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/760,238

(22) PCT Filed: Sep. 27, 2016

(86) PCT No.: PCT/EP2016/072904
§ 371 (c)(1),
(2) Date: Mar. 15, 2018

(87) PCT Pub. No.: WO2017/055239
PCT Pub. Date: Apr. 6, 2017

(65) Prior Publication Data
US 2018/0251973 A1    Sep. 6, 2018

(30) Foreign Application Priority Data

Sep. 29, 2015   (EP) .................... 15187320

(51) Int. Cl.
*H02G 3/22* (2006.01)
*E04B 1/94* (2006.01)
(Continued)

(52) U.S. Cl.
CPC .............. *E04B 1/947* (2013.01); *F16L 5/025* (2013.01); *F16L 5/04* (2013.01); *H02G 3/0412* (2013.01); *H02G 3/0481* (2013.01); *H02G 3/22* (2013.01)

(58) Field of Classification Search
CPC .... E04B 1/947; H02G 3/0481; H02G 3/0412; H02G 3/22; F16L 5/025; F16L 5/04
(Continued)

(56) References Cited

U.S. PATENT DOCUMENTS

| | | | | |
|---|---|---|---|---|
| 1,851,940 A | * | 3/1932 | Williams | F16L 5/08 138/89 |
| 2,732,226 A | * | 1/1956 | Brattberg | H02G 3/22 248/56 |
| 3,726,050 A | * | 4/1973 | Wise | A62C 2/12 137/360 |

(Continued)

FOREIGN PATENT DOCUMENTS

| | | |
|---|---|---|
| AT | 509470 A4 | 9/2011 |
| DE | 8915666 U1 | 1/1997 |

(Continued)

*Primary Examiner* — Adriana Figueroa
(74) *Attorney, Agent, or Firm* — Grüneberg and Myers PLLC

(57) ABSTRACT

A line penetration for routing a line through a passage opening of a building part that includes a first and a second building-part wall, between which an intermediate space is provided. The line penetration has a closure element that includes: an inner part for filling the intermediate space in the region of the passage opening; holding parts, with cross section smaller than that of the inner part, disposed on both sides of the inner part; a straight-through line opening, which penetrates the inner part and the holding parts in the direction in which they are disposed; and a sliding device, which is formed in order to guide the line slidingly and gas-tightly through the line opening.

17 Claims, 2 Drawing Sheets

(51) Int. Cl.
*F16L 5/02* (2006.01)
*F16L 5/04* (2006.01)
*H02G 3/04* (2006.01)

(58) Field of Classification Search
USPC ........................................................ 52/220.8
See application file for complete search history.

(56) References Cited

U.S. PATENT DOCUMENTS

| | | | | |
|---|---|---|---|---|
| 4,086,736 A * | 5/1978 | Landrigan | ................. | F16L 5/04 248/56 |
| 4,249,353 A * | 2/1981 | Berry | ................. | F16L 5/04 52/232 |
| 5,174,077 A * | 12/1992 | Murota | ................. | F16L 5/04 52/220.8 |
| 5,351,448 A * | 10/1994 | Gohlke | ................. | A62C 2/065 52/1 |
| 6,969,799 B2 * | 11/2005 | Snyder | ................. | F16L 5/10 174/483 |
| 6,989,488 B2 * | 1/2006 | Valenziano | ........ | H02G 3/0412 174/483 |
| 8,438,804 B2 * | 5/2013 | Nowoczin | ............ | F16L 59/16 52/220.8 |

FOREIGN PATENT DOCUMENTS

| | | |
|---|---|---|
| DE | 19730153 A1 | 1/1999 |
| DE | 102006000184 A1 | 10/2007 |
| DE | 102006025260 A1 | 12/2007 |
| DE | 102008000420 A1 | 9/2009 |
| WO | WO 96/07453 A1 | 3/1996 |

* cited by examiner

LINE LEADTHROUGH FOR THE LEADTHROUGH OF LINES THROUGH A COMPONENT

TECHNICAL FIELD

The invention relates to a line penetration for routing a line through a building part, especially through a building wall or building ceiling. In particular, the present invention relates in general to fire-protection measures for routing lines through a building part.

TECHNICAL BACKGROUND

In buildings and installations, lines routed through a building part, such as a wall or a ceiling, for example, must satisfy fire-protection requirements. For example, one essential requirement is that combustion gases or even fire must not be permitted to penetrate the building part, i.e. must not be permitted to travel from one room in a building to the next.

For this reason, it is customary, in the case of line penetrations through walls, to fill the intermediate space situated between the line and an inner wall of a passage opening with a flexible and rigid filling material, such as with mortar, PU bricks, acrylate sealing compound, mineral wool, especially in combination with spray coatings and the like.

In the fire situation, stresses may be caused by heat generation, in turn leading to strong mechanical forces between the wall and the line routed through it. Thereby a relative offset may develop between the line and the wall, whereby cracks and gaps may be formed in the filling material. This leads to permeability, possibly permitting combustion gases and fire to pass through.

In particular, considerable displacements between the line and the wall may develop during earthquakes, so that the previous approach of simply filling the intermediate space between the line and the inner wall of the passage opening with a filling material is not optimum. The filling material may detach, tear or break due to the occurring stresses, whereby the required impermeability is impaired. In particular, a relative displacement of the line perpendicular to the wall may lead to partial or complete detachment of the filling material from the line and/or from the passage opening or to tearing of the filling material.

Cable boxes common on the market are intended to route the line either through a combination of solid plastic and sealing material, although thereby the relative mobility of the line is considerably restricted, and so, in the event of violent shaking, damage to the cable box is almost unavoidable and impermeability to gas is no longer assured.

Furthermore, intumescent lamellas may be provided, which indeed ensure improved mobility of the routed line but do not have adequate impermeability to smoke gas.

A further approach is known, for example, from DE 10 2008 000 420 A1, in which a line penetration is disclosed that has a closed space for routing a line. An insert of intumescent material and at least one sealing element of an elastic material are provided in the housing of the line penetration, in order to achieve sealing in the fire situation.

A line penetration for routing lines through a building part is known from DE 10 2006 000 184 A1. The line penetration has a jacket tube and a base part, which is attached to a first axial end of the jacket tube and comprises a receiving space, surrounding a penetration, for a firestop material. Furthermore, an annular membrane-like sealing element is disposed at the first axial end of the jacket tube. A further membrane-like sealing element is disposed at the second axial end of the jacket tube, in order to seal the line penetration.

It is one object of the present invention to provide a line penetration with which one or more lines can be routed through a building part, for example a wall or a ceiling, so that this is impermeable to smoke gases in a fire situation. Furthermore, it is intended to ensure tolerance to shaking and relative displacements between the line and the building part, so that the impermeability of the line penetration is not impaired even after a relative displacement.

DISCLOSURE OF THE INVENTION

This object is solved by the line penetration according to claim 1 as well as by the line-penetration arrangement according to the secondary claim.

Further configurations are specified in the dependent claims.

As used within the scope of the present invention, the singular forms "one", "a" and "an" also include the corresponding plural forms, unless something different can be inferred unambiguously from the relationship. Thus, for example, the term "one" is intended to mean "one or more" or "at least one", unless otherwise indicated.

The terms "exhibit", "with" and "have" are intended to be inclusive and mean that elements other than those cited may also be meant.

According to a first aspect, a line penetration is provided for routing a line through a building part, especially a wall or a ceiling of a building, with a first and a second building-part wall between which an intermediate space is provided, with a closure element comprising:

an inner part for filling the intermediate space in the region of the passage opening;
holding parts, with cross section smaller than that of the inner part, disposed on both sides of the inner part;
a straight-through line opening, which penetrates the inner part and the holding parts in the direction in which they are disposed; and
a sliding device, which is formed in order to guide the line or lines slidingly and gas-tightly through the line opening.

One idea for the above line penetration consists in providing an insert for a hollow building part, especially for a drywall, which permits nondestructive absorption of relative movements between a line routed through the building part and the building part itself. In this way, it is intended that impermeability to gases will be preserved, in order to suppress access of smoke gases through the passage opening in the building part in the fire situation. This is achieved by providing a closure element for a cavity between two building-part walls, in which two oppositely disposed wall openings are provided through the building-part walls.

The closure element has an inner part and holding parts connected thereto on both sides. The holding parts are designed to be received in the oppositely disposed wall openings. The holding parts and the inner part have a straight-through line opening, which extends in the direction in which the holding parts and the inner part are disposed, and in which the line to be routed through the building part is inserted.

The line or lines is/are guided slidingly in the line opening, so that forces oriented in the direction of axial extent of the line or lines or parallel to a surface direction of the building part can be absorbed.

The inner part is shaped such that, in the intermediate space, either it is movable in the direction transverse to the direction of axial extent of the line or lines or is so flexible that it permits corresponding movement of the line or lines. The holding parts, which are disposed in the building-part openings situated opposite from one another, respectively surround the line opening and have a size which, transverse to the direction of axial extent of the line opening, is smaller than the size of the wall openings. Thereby the holding parts prevent displacement of the closure element in the direction of a surface direction of the building part or transverse to the direction of axial extent of the line, so that overloading of the material of the inner part by compression or elongation can be avoided. In this way, impermeability to gas is ensured even after occurrence, for example, of an earthquake, which displaces the closure element in the building part.

Furthermore, an insert element may be provided that has an intumescent material and is disposed in at least one of the holding parts.

In particular, the insert element may surround the line opening and/or be disposed directly on the line opening.

It may be provided that the sliding device has, disposed in the line opening, a sheath and/or a coil of sliding film and/or a pasty slippery substance and/or a solid slippery material, which if necessary is mixed with at least one fire-protection additive and/or has been modified in a manner relevant to fire protection.

Furthermore, one or more cover parts may be provided, which are provided on the holding parts on one side or both sides of the closure element and in particular are formed in one piece with the holding parts and the inner part.

Furthermore, the inner part and the holding parts may be formed in one piece.

According to one embodiment, a clamp may be provided which has circlips that circumferentially surround the holding parts, in order to hold the closure element on the line or lines, wherein especially the circlips have, in the direction of axial extent, a width that corresponds substantially to the width of the holding parts.

The closure element may be formed from a flexible or solid material that is incombustible or fire-retardant.

Furthermore, the closure element may be formed either in one piece with a slit extending in the direction of axial extent of the line opening or in multiple pieces. This permits simple mounting of closure element 5 around line 4.

According to a further aspect, a line-penetration arrangement is provided that comprises the above line penetration and a line, wherein the line opening has an inside cross section that corresponds substantially to the cross section of the line.

Furthermore, a building part may be provided with a first and a second building-part wall, which in particular are disposed with surfaces parallel to one another and between which an intermediate space is provided, wherein the inner part is disposed in the intermediate space and there is held displaceably, preferably transverse to the direction of axial extent of the line opening.

Alternatively, a building part may be provided with a first and a second building-part wall, which in particular are disposed with surfaces parallel to one another and between which an intermediate space is provided, wherein the inner part and the holding elements are formed flexibly and the inner part is fixed, especially clamped, in the intermediate space.

Furthermore, the holding parts may have a cross section that is smaller than the cross section of the wall opening in question.

BRIEF DESCRIPTION OF THE DRAWINGS

Embodiments will be explained in more detail hereinafter on the basis of the attached drawings, wherein.

DESCRIPTION OF EMBODIMENTS

Figure 1:
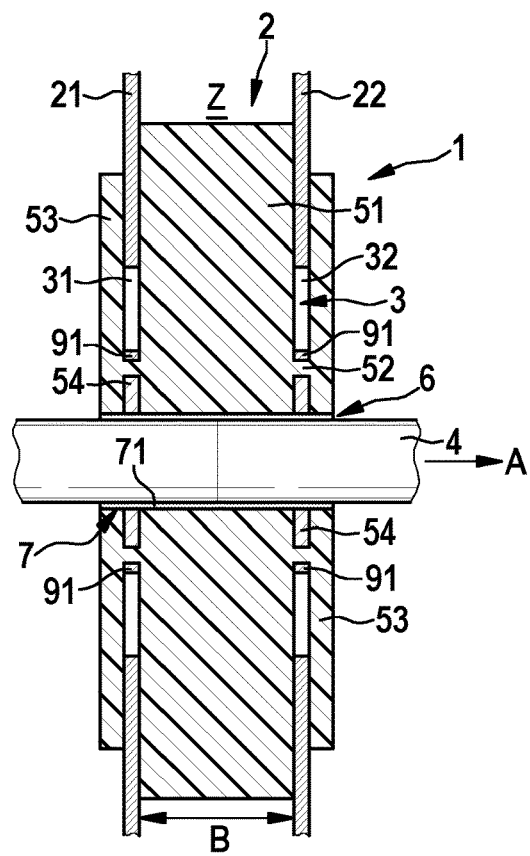
FIG. 1 shows a schematic cross-sectional diagram through a line penetration in a passage opening through a hollow building part.
Figure 2:
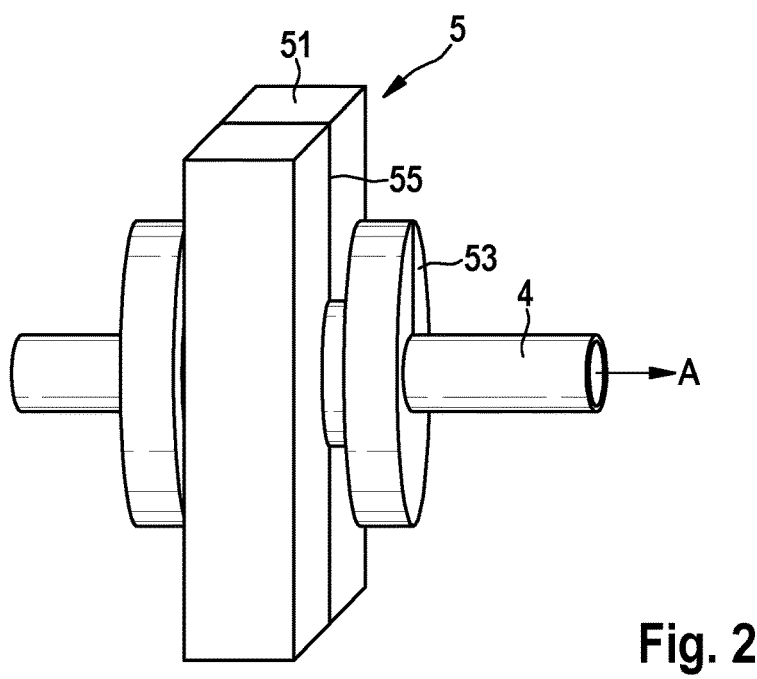
FIG. 2 shows a perspective diagram of the line penetration of FIG. 1.
Figure 3:
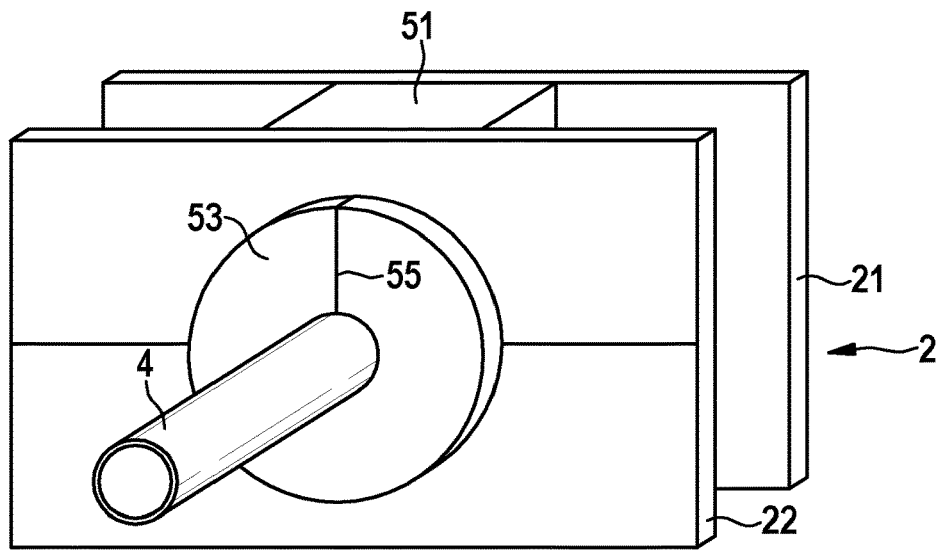
FIG. 3 shows a perspective diagram of a line penetration inserted into the building part.

FIG. 1 schematically illustrates a cross-sectional diagram of a line penetration 1 through a building part 2, such as through a wall or ceiling of a building. FIG. 2 shows line penetration 1 without building part 2, and FIG. 3 shows a perspective diagram of line penetration 1 inserted into building part 2.

Building part 2 has a first building-part wall 21 and a second building-part wall 22, which are disposed opposite one another with a spacing and form an intermediate space Z. Building-part walls 21, 22 are preferably disposed with surfaces parallel to one another. As an example, such a building part 2 may be a drywall, wherein these building-part walls 21, 22 are frequently gypsum boards or the like.

Building-part walls 21, 22 have a first or a second wall opening 31 or 32, which are disposed opposite one another relative to intermediate space Z. A passage opening through building part 2 is formed by wall openings 31, 32. In the present exemplary embodiment, wall openings 31, 32 have round cross sections, but wall openings 31, 32 may also be provided with cross sections differing therefrom.

A line 4 is routed through passage opening 3. Line 4 may be a cable, a cable duct, a pipe, a cable route, a ventilation pipe, a ventilation damper or a similar component.

A closure element 5 is disposed in intermediate space Z between building-part walls 21, 22. A straight-through line opening 6, through which line 4 is routed or is intended to be routed, extends through closure element 5.

Closure element 5, which is illustrated in perspective in FIG. 2 without building-part walls 21, 22, has an inner part 51, the width B of which corresponds to the spacing of wall parts 21, 22 or to the width of intermediate space Z. In particular, width B of inner part 51 is adapted to the spacing of building-part walls 21, 20 in such a way that inner part 51 is able to move in surface direction of building-part walls 21, 22 or transverse to the direction of axial extent A of line opening 6.

Holding parts 52, which are disposed in wall openings 31, 32 during insertion of closure element 5 into building part 2, are disposed opposite one another over the width of inner part 51. Holding parts 52 are disposed in building-part openings 31, 32 situated opposite from one another, and have a size, which, transverse to the direction of axial extent of line opening 6, is smaller than the size of wall openings 31, 32. Thereby holding parts 52 prevent displacement of closure element 5 in the direction of a surface direction of the building part or transverse to the direction of axial extent of line 4, so that overloading of the material of the inner part by compression or elongation can be avoided.

Alternatively, inner part 51 may be clamped between building-part walls 21, 22, so that movement of closure element 5 transverse to the direction of axial extent A of line opening 6 is suppressed. In order to absorb movements of line 4 transverse to the direction of axial extent A, the material of closure element 5 may be flexible, so that mobility of the line in line opening 6 is assured.

Between line 4 and line opening 6, it is possible to provide a sliding device 7, which permits sliding of line 4 in the direction of axial extent A. Sliding device 7 may be formed by means of a sheath 71, which inside closure element 5 extends in line opening 6 and which, for line 4, is made capable of sliding with a substance capable of sliding, such as a pasty slippery substance, e.g. a lubricant or a gel, or solid slippery materials, such as non-stick tape or PTFE. Alternatively, sliding device 7 may also provided by providing a substance capable of sliding or a material capable of sliding directly between the inside wall of the line opening in inner part 51 and holding parts 52.

Closure element 5 may be formed from a solid or elastic material, especially containing polyacryl, building foam and the like, for example, that is formed to be incombustible or fire-retardant.

Especially in the region of holding parts 52, an insert element 54 respectively surrounding line opening 6 may be provided that contains an intumescent material. Preferably, insert elements 54 are disposed directly around line opening 6 in holding parts 52. In the fire situation, insert element 54 expands due to exposure to heat. Thereby line 4 situated in line opening 6 can be squeezed. Thereby permeability to gas that may occur in the fire situation due to melting of line 4 is prevented by building part 2.

Closure element 5 may further have, on one or both sides, cover parts 53, which are connected from outside onto holding parts 52 and have a size sufficient to cover the respective wall opening 31, 32 located between inner part 51 and cover part 53 in question. In particular, the size of the respective cover part 53 is chosen such that, even in the event of a displacement of holding part 52 inside wall opening 31, 32, complete coverage of the wall opening in question by cover part 53 is assured. Cover part 53 on the one hand may represent protection of wall opening 31, 32 from view and on the other hand, in the fire situation, it may contribute additionally to the impermeability to gases of wall openings 31, 32.

Furthermore, in the event of expansion of the material of insert element 54, cover part 53 may support the direction of expansion in the direction of line opening 6, so that it may be reliably assured that line 6 will be closed in the fire situation.

In particular, it is possible to form inner part 51 and holding parts 52 in one piece and cover parts separately, or to form inner part 51, holding parts 52 and cover parts 54 in one piece. Closure element 5 may be formed either in one piece with a slit 55 extending in the direction of axial extent A of line opening 6 or in multiple pieces, in order that it can be placed on an existing line 4.

Figure 4:
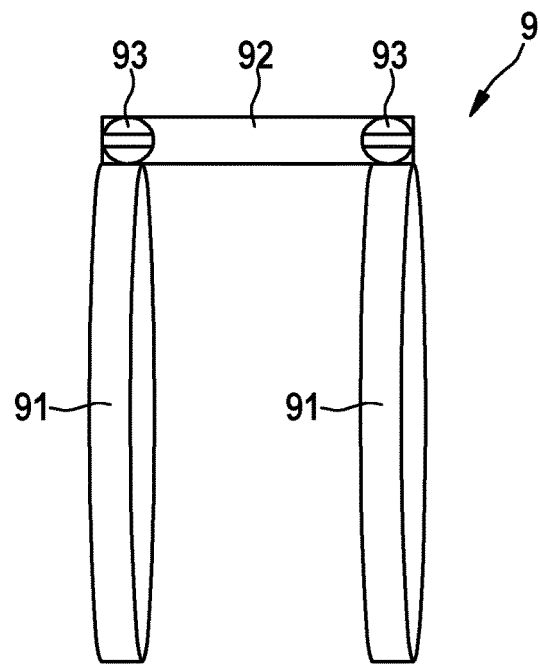
FIG. 4 shows a clamp for fixing the closure element.

In order to hold closure element 5 around line 6, a clamp 9, especially of metal, may be provided, as illustrated by way of example in FIG. 4. For each holding part 51, clamp 9 has circlips 91, which surround holding parts 51 and bear thereon, preferably completely circumferentially. Thereby it may be further achieved that the volume expansion of insert elements 54 in the fire situation preferably takes place inwardly and thus that line 4 is squeezed in better manner.

To hold circlips 91 in position more reliably, a bridge element 92, likewise preferably metallic, may be provided, which is fastened via screw connections 93, which are also used to close circlips 91. Bridge element 92 may then be routed through axially extending slit 55 of closure element 5, formed on one piece or multiple pieces.

Line penetration 1 is established by first installing first building-part wall 21 and routing line 4 through the existing first wall opening 31. Line 4 may be provided with sliding device 7, e.g. smeared with a pasty slippery substance. Thereupon closure element 5 is inserted in first wall opening 31, so that the line is routed through straight-through line opening 6 of closure element 5. Now second building-part wall 22 can be installed, so that it is received in the region of second holding element 52 between inner part 51 and cover part 54 of closure element 5.

The invention claimed is:

1. A line penetration for routing a line through a passage opening of a building part that comprises a first and a second building-part wall, between which an intermediate space is provided, the line penetration comprising:
   a closure element that comprises:
   an inner part for filling the intermediate space in the region of the passage opening;
   holding parts, with cross section smaller than that of the inner part, disposed on both sides of the inner part;
   a straight-through line opening, which penetrates the inner part and the holding parts in the direction in which they are disposed; and
   a sliding device, which is formed in order to guide the line slidingly and gas-tightly through the line opening,
   wherein the line penetration further comprises a clamp, which has circlips that circumferentially surround the holding parts, suitable for holding the closure element on the line,
   wherein each circlip substantially surrounds one of the holding parts;
   wherein the clamp further comprises a bridge fastened to the circlips.

2. The line penetration according to claim 1, wherein the closure element further comprises:
   an insert element that has an intumescent material and is disposed in at least one of the holding parts.

3. The line penetration according to claim 2, wherein the insert element surrounds the line opening and/or is disposed directly on the line opening.

4. The line penetration according to claim 1, wherein the sliding device has, disposed in the line opening, at least one of a sheath, a coil of sliding film, a pasty slippery substance, and a solid slippery material.

5. The line penetration according to claim 1, wherein the closure element further comprises:
   one or more cover parts, which are provided on the holding parts on one side or both sides of the closure element.

6. The line penetration according to claim 1, wherein the inner part and the holding parts are formed in one piece.

7. The line penetration according to claim 1, wherein the closure element comprises a flexible or solid material that is incombustible or fire-retardant.

8. The line penetration according to claim 1, wherein the closure element is in the form of one piece with a slit extending in the direction of axial extent of the line opening or is in the form of multiple pieces.

9. A line-penetration arrangement, comprising:
   a line penetration according to claim 1;
   a line,
   wherein the line opening has an inside cross section that corresponds substantially to the cross section of the line.

10. The line-penetration arrangement according to claim 9, wherein the first and second building-part walls are disposed with surfaces parallel to one another,
wherein the inner part is disposed in the intermediate space and there is held displaceably, transverse to the direction of axial extent of the line opening.

11. The line-penetration arrangement according to claim 9, wherein
the first and second building-part walls are disposed with surfaces parallel to one another,
wherein the inner part and the holding elements are formed flexibly and the inner part is fixed.

12. The line-penetration arrangement according to claim 9, wherein
the holding parts have a cross section that is smaller than the cross section of the wall opening.

13. The line penetration according to claim 1, wherein the closure element further comprises:
one or more cover parts, which are provided on the holding parts on one side or both sides of the closure element,
wherein the cover parts are formed in one piece with the holding parts and the inner part.

14. The line penetration according to claim 1, wherein the closure element further comprises:
a clamp which has circlips that circumferentially surround the holding parts, in order to hold the closure element on the line,
wherein the circlips have, in the direction of axial extent, a width that corresponds substantially to the width of the holding parts.

15. The line-penetration arrangement according to claim 9, wherein
the first and a second building-part walls are disposed with surfaces parallel to one another,
wherein the inner part and the holding elements are formed flexibly and the inner part is fixed by being clamped in the intermediate space.

16. The line penetration of claim 1, wherein the bridge extends through an axially-extending slit in the closure element.

17. The line penetration of claim 1, wherein the bridge is fastened to the circlips via screw' connections, and wherein the bridge is metallic.

* * * * *